United States Patent Office 3,224,071
Patented Dec. 21, 1965

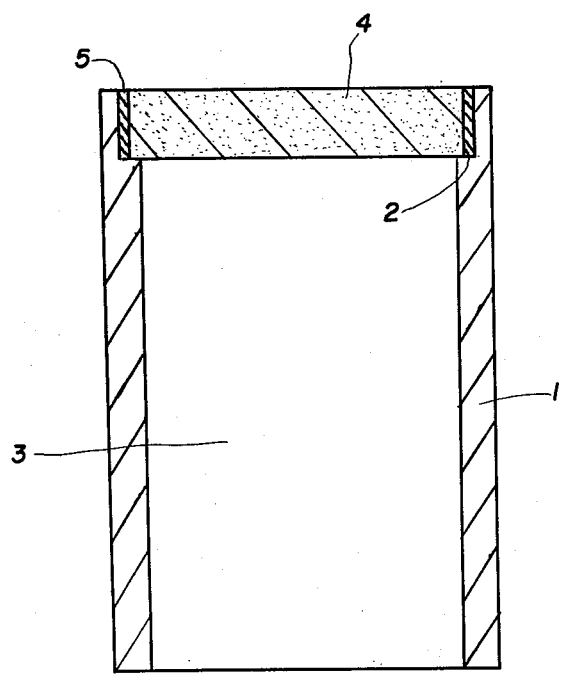

3,224,071
BRAZING METHOD FOR POROUS BODIES
Roberto Levi, New York, and Robert Vann Eggleston, Hastings on Hudson, N.Y., assignors to North American Philips Company, Inc., New York, N.Y., a corporation of Delaware
Filed Mar. 14, 1960, Ser. No. 14,793
9 Claims. (Cl. 29—155.5)

This invention relates to a method for brazing a porous metal member to another body. In particular, this invention relates to a method for brazing together a porous refractory-metal member onto a support.

In the manufacture of certain types of thermionic dispenser cathodes, a porous tungsten member with interconnected pores is formed by a powder metallurgical process including sintering at a very high temperature to produce a relatively dense body, e.g., 83% dense. Thereafter, an emissive-enhancing material is melted into the pores of this tungsten body. For example, the emissive material may be a fused mixture of barium oxide and aluminum oxide, and the impregnating temperature about 1750° C. The impregnated body represents the emissive portion of the cathode, which is then mounted in the end of a hollow, cylindrical support beneath which is then provided a suitable heating filament. The conventional mounting method involves providing a step at the end of the cylinder, which is usually of molybdenum, seating the impregnated member, which has a slight taper, in that step, and then peening over the end of the cylinder to lock the impregnated member therein. However, such a structure, which uses only a mechanical joint, cannot withstand stringent vibration and acceleration, which would be necessary if such a cathode were incorporated into a microwave tube as part of equipment in military aircraft or missiles. An attempt to overcome these difficulties resulted in the development of a brazing process using a low melting point metal such as nickel as the braze. In this process, the nickel is used to braze the impregnated body to its support. However, the presence of nickel limits the maximum operating temperatures of the cathode, because above a certain temperature, the nickel has too high a vapor pressure for use in an evacuated electron device. However, there are many applications in which such cathodes are required to produce high-emission densities, which necessitates temperatures of at least 1050° C., possibly even as high as 1150° C., to meet these requirements. For these applications, which are becoming more and more common in the art, nickel would probably be ruled out as a suitable brazing material. The choice of higher melting temperature brazing materials, which would exhibit sufficiently low vapor pressures at the operating temperature of the cathode, are severely limited by the sensitive nature of the cathode emitter surface and its high susceptibility to poisoning. Thus, while many brazing materials of intermediate melting points are available, all of them have been found to produce poisoning of the cathode and thus makes them useless in this environment. There are several brazing materials which, it has been found, can be employed for the purposes required because they have low vapor pressures in the range of 950° C. to 1200° C. and do not generate any poisoning agents inhibiting the cathode's emission. However, these brazing materials melt at about 2,000° C. so that the brazing operation must be carried out at this temperature. However, if the impregnated pellet is subjected to such a temperature, the barium compound in the pores would be destroyed rendering the cathode inoperable. It had also been thought to carry out the brazing operation before the impregnation step, which would involve brazing of the porous tungsten body to the support, after which the emissive enhancing material could be melted into its pores. However, the difficulty then arose that when the brazing material liquified during the brazing operation, it entered the pores of the porous refractory member by capillary action, which reduced or completely eliminated the pore volume which later could be impregnated with the barium compound.

The chief object of the invention is to provide a method for securing together a porous metal body and another member without any substantial reduction in the porosity of the body.

A further object of the invention is a technique for brazing together a porous refractory-metal body to a refractory-metal support with a brazing material exhibiting low vapor pressure at elevated temperatures.

Still a further object of the invention is to provide a method for making a thermionic dispenser cathode in which the emissive-material-impregnated body is solidly brazed to a refractory-metal support without injury to the emission properties of the cathode.

These and further objects of the invention are attained by a technique which involves filling the pores of the porous member with an inert material which is capable of subsequent removal. This inert material must not alloy with the porous member. The inert-material-filled porous body is then brazed to the support, preferably at atmospheric pressure, with a brazing material whose melting point is above any temperature to which the assembly is thereafter subjected. During this brazing process, the brazing material liquifies, but is maintained substantially out of the pores of the porous member by means of the barrier afforded by the inert material already present therein. Capillary attraction maintains the inert material within the pores at this brazing temperature and prevents it from being vaporized or lost so it can continue to exhibit this barrier function. It also preferably has a low vapor pressure at the brazing temperature. Thereafter, the inert material is removed from the pores of the member leaving an empty porous member solidly brazed to its support. Thereafter, if desired to make a dispenser cathode, the pores can then be impregnated with the emission-enhancing material. As an inert material, it is preferred to use one of the metals, copper, silver, or gold. The presence of these materials in the pores of the member affords the advantage that it can also be utilized in a machining operation to shape the porous body to a desired shape and dimensions.

The invention will now be described in more detail with reference to the accompanying drawing, in which the sole figure is a cross-sectional view of an intermediate structure useful in the formation of a dispenser cathode.

Referring now to the drawing, there is shown therein a cylindrical support member 1, which can function as a support for an emissive body in the manufacture of a planar, thermionic dispenser cathode. The support is usually of a refractory metal, such as molybdenum or tantalum. It is provided with a recess or step 2 at one end, which is used to support the impregnated, refractory-metal member which functions as the electron emitting portion of the dispenser cathode. In the space 3 within the hollow support 1 may be provided, after the fabrication steps now to be described, the usual heating filament for the cathode. The emissive portion of the cathode is constituted by a porous refractory-metal member of generally cylindrical shape with opposed flat surfaces. This member is generally made by compacting together tungsten particles of a desired particle size and distribution, and sintering the compacted mass at a high temperature to produce a fully-sintered, very strong, highly dense member containing interconnected pores. The sintering temperature normally employed is about 2400° C., and the density generally obtained is about 83% of the theoretical density of solid tungsten. In general, the density may vary between about 60% and 90%. However, the pores should be interconnected so that diffusion of materials from the interior to the outer surfaces of the refractory metal member becomes possible. The porous member is usually constituted of tungsten alone, or may be of an alloy of molybdenum and tungsten. Other useful materials include rhenium. For non-cathode applications, molybdenum, hafnium, and niobium may be used. These same materials can also be employed for the support.

In accordance with the invention, the pores of this refractroy metal member are filled with an inert material to serve as a barrier against entry of the liquid brazing material during the brazing step. As inert materials, it is preferred to use copper, silver, or gold. For example, with copper, it is merely necessary to place a mass of copper in contact with the porous refratcory-metal member and heat the assembly to about 1350° C. in hydrogen or in an inert atmosphere so that the copper melts and fills the pores of the refractory-metal member by capillary action. An advantage of using copper, silver, or gold is that the refractory-metal member, if of tungsten, can now be machined by the usual cutting operations, such as drilling, turning, milling, etc., to form any desired configuration or shape to any tolerances required. This has already been described and claimed in United States Patent No. 2,669,008, whose disclosure is hereby incorporated by reference into this specification.

After the machining operation has been completed, and while the copper still remains in the pores of the refractory-metal member, the brazing operation is carried out. In its simplest form, where the impregnated refractory-metal member, which is referred to by reference numeral 4 in the drawing, has a shape of a cylindrical disc, this is accomplished by simply coating the periphery of the disc with a small amount 5 of the brazing material, or coating the inside periphery of the recess 2 with the brazing material. Next the disc 4 is assembled into the recess 2, and the assembly now heated to the melting point of the brazing material, preferably in an inert atmosphere, such as nitrogen, helium, hydrogen, or combination thereof, preferably at or above atmospheric pressure to reduce loss of the inert material. As soon as the braze melts, the applied heat can be terminated. The brazing material employed must naturally wet the surfaces of the members to be joined together, and if this is done, then, when the assembly is cooled down to room temperature, it will be found that a solid vibration- and acceleration-proof joint had been provided between the two members. During the brazing process, the copper in the pores of the disc 4 serves as a barrier preventing entry of the liquid brazing material. Even though the copper is rendered molten at the brazing temperature, still capillary action maintains it in the pores and, even in the liquid state, it serves as a barrier agianst any entry of the brazing material. Since it may become liquid, the inert filler material selected preferably has a low vapor pressure at the brazing temperature else it would be vaporized during the brazing step out of the pores and thus permit entry of the brazing material. Further, the brazing material employed, and its alloy phase with the porous refractory-metal member and the support, should possess a brazing or melting temperature above any temperature to which the assembly may be thereafter subjected, which will become clearer in the further description of the process.

After the brazing step has been completed, the copper in the pores is then removed. This may be done by reheating the assembly in vacuum at a temperature of about 1700° C., at which the copper is vaporized from the pores and thus completely expelled from the sintered tungsten body. As this removal step occurs at a temperature below the brazing temperature, the brazed joint remains unaffected. In the continuing manufacture of a dispenser cathode, the thus-emptied pores would now be filled with the emission-enhancing material. For example, a fused mixture of barium oxide and aluminum oxide in a 5:2 mole ratio is placed in contact with the porous tungsten member 4 and the assembly then raised to a temperature of 1750° C. in an inert atmosphere, such as hydrogen, nitrogen, or helium, with a predominantly hydrogen atmosphere being preferred, at which the barium compound melts and enters the empty pores by capillary action. As will be noted, this operation is also carried out at a temperature below the melting point of the brazing material. Other suitable emissive materials, which are known in the art, include those described in a copending application, Serial No. 487,042, filed February 9, 1955, now abandoned, and in United States Patents Nos. 2,700,118, and 2,917,415. Finally, the heating filament is located in the empty space 3 beneath the brazed tungsten disc, and the cathode is ready for assembly in the usual way into an electron tube.

As brazing materials, I prefer to use molybdenum alloys, as these possess low vapor pressures at the operating temperatures of the cathode and do not exhibit any poisoning effects on the cathode. Molybdenum boride having a melting point of about 2000° C., and which can be used for joining molybdenum to tungsten, and molybdenum ruthenium, for example, in a 4:1 ratio by volume, are preferred alloys in this group. These materials melt at about 2000° C. and this is the temperature to which the brazing material must be elevated. For application purposes, the braze may be provided in powder form and mixed with a vehicle such as amylacetate plus collodion if desired so that it can be painted or brushed onto the surfaces to be joined. As a further possibility, they may be provided in ring or other lumped form and provided at the junction of the surfaces to be bonded, whereupon, when they melt, they contact the surfaces to be joined by capillary action. The brazing materials used should preferably have a brazing temperature in the range of 1800° C. to 2200° C.

Similar techniques may be employed in the manufacture of other devices where it is required to provide a brazed assembly of a porous refractory-metal member to another body. An example of this is in the manufacture of cesium ion engines, which comprise a refractory-metal enclosure of which one wall is constituted by a refractory-metal porous partition. In the enclosure is supplied cesium. In operation, when the enclosure is heated, ionization of the cesium occurs as it traverses the heated porous refractory-metal partition. Thus, in this embodiment, the porous refractory-metal member does not have its pores filled with another substance but they remain empty in operation. In this situation too, however, it must be insured that the brazing operation whereby the refractory-metal partition, which may be of tungsten, is brazed to the remainder of the enclosure, e.g. of molybdenum, the liquid brazing material does not fill up the pores of the tungsten member and prevent the cesium ions from existing thereby.

The inert material in the pores can also be removed by means other than volatilization. For example, if the porous member is thin enough, filler material can be removed by leaching, preferably using ultrasonic agitation. For example, for a copper-impregnated tungsten member brazed to a tantalum support, nitric acid can be used as the leaching agent.

While we have described our invention in connection with specific embodiments and applications, other modifications thereof will be readily apparent to those skilled in this art without departing from the spirit and scope of the invention as defined in the appended claims.

What is claimed is:
1. A method for brazing a porous metal member selected from the group consisting of tungsten, tungsten-molybdenum alloy, rhenium, molybdenum, hafnium and niobium with interconnected pores to a support without substantially reducing the porosity of the metal member utilizing a brazing material which when molten will penetrate the pores of said member if contacted thereto, comprising the steps of filling the pores of the metal member with a filler substance substantially unreactive with the porous metal member and capable of removal therefrom and having a low vapor pressure at the melting temperature of the brazing material, placing the filled metal member on the support with said brazing material in the vicinity of their junction, thereafter heating the assembly until the brazing material liquifies, said filler acting as a barrier and preventing the liquid braze from penetrating the pores of the metal member, cooling the assembly to refreeze the brazing material and form a solid bond between the support and the metal member, and thereafter removing the filler substance from the pores of the metal member.

2. A method of brazing a porous refractory-metal member selected from the group consisting of tungsten, tungsten-molybdenum alloy, rhenium, molybdenum, hafnium and niobium to a refractory-metal support without substantially reducing the porosity of the metal member utilizing a brazing material which when molten will penetrate the pores of said member if contacted thereto, comprising the steps of filling the pores of the metal member with a filler substance substantially unreactive with the porous metal member and capable of removal therefrom and having a vaporization temperature substantially below the melting point of the brazing material but a low vapor pressure at said melting point, placing the metal member on the support with said brazing material at their junction, thereafter heating the assembly until the brazing material liquifies, said filler acting as a barrier and preventing the liquid braze from penetrating the pores of the metal member, then cooling the assembly to refreeze the brazing material and form a solid bond between the support and the metal member, and thereafter reheating the assembly to a temperature below the melting point of the brazing material and below that temperature at which substantial vaporization of the metal member and support occur and at which the filler substance is vaporized and expelled completely from the pores of the metal member.

3. A method of brazing a porous refractory-metal member selected from the group consisting of tungsten, tungsten-molybdenum alloy, rhenium, molybdenum, hafnium and niobium with interconnected pores to a refractory-metal support without substantially reducing the porosity of the metal member utilizing a brazing material which when molten will penetrate the pores of said member if contacted thereto, comprising the steps of filling the pores of the metal member with a metal substantially unreactive with the porous metal member and capable of removal therefrom and having a vaporization temperature substantially below the melting point of the brazing material but a low vapor pressure at said melting point, placing the metal-filled metal member on the support with said brazing material constituted of a molybdenum alloy at their junction, thereafter heating the assembly until the brazing material liquifies, said filler acting as a barrier and preventing the liquid braze from penetrating the pores of the metal member, then cooling the assembly to refreeze the brazing material and form a solid bond between the support and the metal member, and thereafter reheating the assembly in vacuum to a temperature below the melting point of the brazing material and below that temperature at which substantial vaporization of the metal member and support occur and at which the filler substance is vaporized and expelled completely from the pores of the metal member.

4. A method for brazing a porous tungsten member to a support without substantially reducing the porosity of the metal member utilizing a brazing material which when molten will penetrate the pores of said member if contacted thereto, comprising the steps of filling the pores of the tungsten member with a metal selected from the group consisting of copper, silver, and gold, placing the metal member on the support with said brazing material having a melting point above 1800° C. but below 2200° C. in the vicinity of their junction, thereafter heating the assembly until the brazing material liquifies, said filler acting as a barrier and preventing the liquid braze from penetrating the pores of the metal member, cooling the assembly to refreeze the brazing material and form a solid bond between the support and the metal member, and thereafter volatilizing the filler substance from the pores of the metal member.

5. A method as set forth in claim 4, wherein the filled tungsten member is machined before the brazing operation.

6. A method as set forth in claim 4 wherein the brazing material is a molybdenum alloy.

7. A method as forth in claim 4 wherein an emission-enhancing material is melted into the pores of the brazed metal member.

8. A method of brazing a porous tungsten member to a refractory-metal support without substantially reducing the porosity of the metal member utilizing a brazing material which when molten will penetrate the pores of said member if contacted thereto, comprising the steps of melting into and thus filling the pores of the tungsten member with a metal selected from the group consisting of copper, silver, and gold, machining the metal-filled tungsten member to a desired shape and dimensions, placing the machine-filled tungsten member on the support with said brazing material constituted of a molybdenum alloy at their junction, said brazing material having a melting point between 1800° C. and 2200° C., thereafter heating the assembly until the brazing material liquefies, said filler acting as a barrier and preventing the liquid braze from penetrating the pores of the metal member, then cooling the assembly to refreeze the brazing material and form a solid bond between the support and the tungsten member, and thereafter reheating the assembly to a temperature below the melting point of the brazing material at which the metal filler substance is vaporized and expelled completely from the pores of the tungsten member.

9. A method as set forth in claim 8 wherein a barium compound, emission-enhancing material is melted into the pores of the brazed tungsten member.

References Cited by the Examiner
UNITED STATES PATENTS

| | | | |
|---|---|---|---|
| 1,243,041 | 10/1917 | Clark | 29—424 X |
| 2,333,271 | 11/1942 | Patterson | 29—420.5 |
| 2,390,805 | 12/1945 | Merryman | 29—191.2 |
| 2,401,483 | 6/1946 | Hensel | 29—191.2 |
| 2,455,309 | 11/1948 | Levin | 29—494 X |
| 2,461,410 | 2/1949 | Clark | 29—191.2 |
| 2,464,591 | 3/1949 | Larsen et al. | 29—504 X |
| 2,519,683 | 8/1950 | Marien | 29—191.2 |
| 2,633,628 | 4/1953 | Bartlett | 29—420 |
| 2,663,928 | 12/1953 | Wheeler. | |
| 2,698,913 | 1/1955 | Espersen. | |
| 2,721,372 | 10/1955 | Levi | 29—420.5 X |
| 2,769,708 | 11/1956 | Coppola et al. | 29—182.5 X |
| 2,741,828 | 4/1956 | Matthew | 29—191.2 |
| 2,775,809 | 1/1957 | Steinitz | 29—504 X |
| 2,793,427 | 5/1957 | Marvin | 29—420.5 |
| 2,996,795 | 8/1961 | Stout | 29—420.5 X |

JOHN F. CAMPBELL, *Primary Examiner.*

NEDWIN BERGER, HYLAND BIZOT, *Examiners.*